United States Patent [19]

Kelyman

[11] Patent Number: 4,846,975
[45] Date of Patent: Jul. 11, 1989

[54] ANAEROBIC DIGESTION PROCESS

[75] Inventor: John Kelyman, Germantown, Tenn.

[73] Assignee: Beloit Corporation, Beloit, Wis.

[21] Appl. No.: 118,365

[22] Filed: Nov. 6, 1987

[51] Int. Cl.$^4$ ............................ C02F 3/28; C05F 9/00
[52] U.S. Cl. .................................... 210/603; 210/609;
210/332; 71/10; 71/901; 422/184; 435/167
[58] Field of Search ............. 210/603, 195.1, 196,
210/323.1, 297, 609, 783, 784, 332, 396;
435/167, 287, 312, 801; 71/10, 901; 422/184

[56] References Cited

U.S. PATENT DOCUMENTS

| | | | |
|---|---|---|---|
| 2,823,106 | 2/1958 | Pierson | 71/10 |
| 3,236,604 | 2/1966 | Pierson | 71/901 |
| 3,577,229 | 5/1971 | Brück | 71/10 |
| 3,643,806 | 2/1972 | O'Cheskey | 210/332 |
| 3,814,260 | 6/1974 | Daubman et al. | 210/396 |
| 4,203,755 | 5/1980 | Ruckstuhl | 71/901 |
| 4,207,190 | 6/1980 | Sheaffer | 210/332 |
| 4,326,874 | 4/1982 | Burklin | 71/901 |
| 4,358,383 | 11/1982 | Asp | 210/332 |

Primary Examiner—Benoit Castel
Attorney, Agent, or Firm—Dirk J. Veneman; Raymond W. Campbell

[57] ABSTRACT

A process for treating waste material is disclosed wherein the initial steps are performed in the dry stage including the removal of dirt, metallic and glass materials, and separation of the dry materials and thereafter passing the materials through a horizontal rotary pulp separating mechanism which delivers to a pulper and to an anaerobic process chamber.

4 Claims, 1 Drawing Sheet

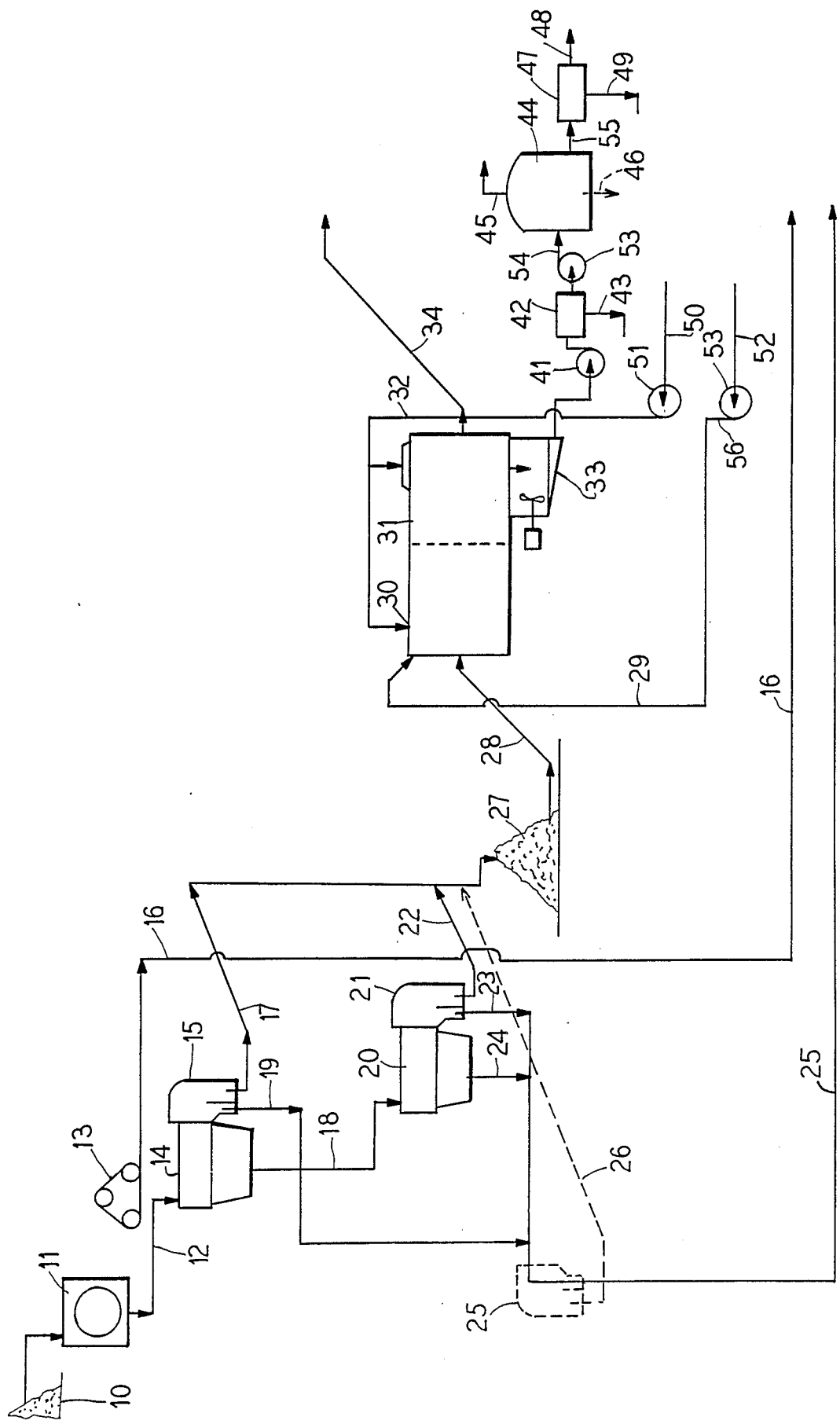

ANAEROBIC DIGESTION PROCESS

BACKGROUND OF THE INVENTION

The invention relates to improvements in methods for the continuous treatment of refuse such as garbage.

In the treatment of waste materials gathered in municipalities, the increase in volume and variety has caused a substantial increase in handling problems and expensive handling. The increase is caused due to the diversity of materials being handled and the increased consumption of the individual, but large increase is attributable to the growth of use of paper products in packaging and marketing. Such paper products pose a problem in the increase in volume and bulk of material and present a waste material which has the potential of utilization as a valuable by-product.

Processes heretofore used by small municipalities such as burning and burying have become very impractical in crowded areas and do not address the issue of the value of recovery of wastes. A significant by-product which has been addressed by various processes is the production of gas and the production of pulp products.

SUMMARY OF THE INVENTION

It is accordingly an object of the present invention to provide an improved method for the treatment of waste in an improved manner wherein a continuous process may be employed effecting economies in the costs of energy not heretofore available.

A still further object of the invention is to provide an improved method for the treating of garbage and similar wastes to increase the value and use of by-products obtained. A still further object of the invention is to provide an improved method wherein initial treatments encompass a dry processing of the material and subsequent continuous treatment involves handling the material in a rotary drum in an aqueous solution with subsequent pulping of one of the waster by-products and anaerobic treatment of another of the waste by-products.

Other objects, advantages and features will become more apparent with the disclosure of the preferred apparatus and method for practicing the invention as disclosed in connection with the teaching of the principles of the concept described and disclosed in the specification, claims and drawings, in which:

BRIEF DESCRIPTION OF THE DRAWINGS

The single FIGURE of the drawing is an overall schematic view of a process embodying the concepts of the present invention.

DESCRIPTION OF THE PREFERRED EMBODIMENTS

As shown on the drawing, a supply of unsorted garbage and waste, line 10, is received by the mechanism for processing and such material is first fed into a limited size reduction unit 11 (such as a flail mill or slow speed shredder) which will function to break up the containers and liberate the waste. Material is fed in a dry state along line 12 and is subjected to an intensive magnetic field provided by an apparatus 13 (magnet) for separation of metallic materials with the metallic materials being fed through line 16.

The materials are then fed in a dry state onto a separation screen (primary rotary disc screen) 14 which removes dirt, small organic materials, glass, plastic and non-ferrous metal particles, wherein the separated small particles are fed out at line 18 and an air knife separator 15 separates remaining heavies from recovered organic materials and plastics. The separated heavies from the air knife separator are passed along line 19 with the large recovered organic material, textiles and plastics being transported to bulk storage along line 17.

The small particles of dirt, glass, organic and non-metallic materials in line 18 are directed down to a second fine rotary disc screen 20 with the fine particles of dirt, glass, plastics and fine organic materials passing along line 24. The larger small organic materials and non-ferrous metals are processed through a second air knife separator 21 for further concentration of organic material along line 22 to a bulk storage area. Other remaining heavies and non-ferrous metals will be rejected in the air knife separator 21 and will pass along line 23.

An optional third air knife separator 25a would possibly be used to recover fine organic materials (such as grass clippings and light mulch), lines 19, 24 and 23, which would be transported to bulk storage on line 26 while the heavy concentrated, inorganic materials would be removed from the system along line 25.

Organic materials recovered from lines 17, 22 and optional line 26 will be stored in a dry state at bulk storage 27. The dry material is reclaimed and metered along line 28 and delivered into an aqueous medium rotating drum. The purpose of the aqueous medium rotating drum 30 and 31 is to reduce the organic materials into a pulp by the combination of a horizontal general flow with a gentle action of water, and heat and mechanical energy to conduct defibration. The drum will not reduce or damage non-usable materials such as textiles or plastics. The oversize non-usable materials are rejected out of the drum discharge end, line 34, and will be retained in bulk storage before disposal. Within the horizontal rotating drum 30 and 31, which is divided into separate chambers, as indicated by the numbers 30 and 31, the waste materials is wetted to about 15% solids consistency and the material is successively dropped on a hard surface. A very high degree of defibration is reached at an approximately one meter dropping distance by repeating the operation 200 times or more. The rotating drum also operates as a screen and for this purpose, the portion 31 has a portion of the outer shell perforated. The first chamber 30 is not perforated so as to enable the materials to be wetted and treated long enough to become fiberized. Consistency in the zone 30 is kept at about 15% and the drum is slightly inclined to cause the material to move forward, that is, from the left to the right in the schematic drawing. In the section 31, the material is diluted to a low consistency and the fiber material washed out thorugh the perforations. The reject material which is too strong to disintegrate in the gentle defiberizing process and too large to get through the perforations, is rejected and passed as a solid through a line 34 to bulk storage of large plastics and textiles to be incinerated or landfilled.

The material which passes out through the perforations of the rotating drum portion 31 will be collected in a holding chest 33 that is connected to a pump 41 to be delivered to a mixing tank 42. The mixing tank 42 will mix the defiberated pulp with thickened sewage sludge from line 43, which will be blended into a homogenized anaerobic digester feedstock through a powered impeller within the tank 42. The homogenized digester feedstock is pumped into the anaerobic digester 44 by pump 53 along line 54.

Within the anaerobic digester 44 the decomposition of cellulose which makes up the defiberized pulp will result in the generation of methane gas $CH_4$ and sludge. The methane gas is collected and removed from the digester by line 45 to $CO_2$ scrubbers, dehydration and compression. Heavy grit and sludge will be physically removed from the tank by line 46. Sludge is removed from the digester via line 55 and delivered to a belt filter 47 press for sludge thickening. The recovered water, which is at approximately 150 degrees F. will be pumped into the pulping drum 30 section to aid in the defiberizing operation along line 50 through pump 51 and line 32 into zone 30 of the pulping drum. The thermo energy recovered from the digester sludge will be used to reduce the mechanical energy required to soften the cellulose fiber in zone 30 of the rotary drum. Pump 53 will remove excess filtrate water from the anaerobic digester at approximately 150 degrees F. along line 52 and into zone 30 via line number 56. Thickened sludge from filter press 47 will be transported to incineration or bulk storage along line 48.

I claim as my invention:

1. A waste treating method for handling municipal waste material, comprising the steps:
   passing said municipal waste material first through a coarse flail mill for an initial breaking up of containers and liberating of material without substantial size reduction of the liberated municipal waste material;
   removing metallic and glass materials from the liberated municipal waste material being treated through uniform, constant dry mechanical screening to obtain thereby a material stream of predominantly organic materials; said removing step including:
      passing the liberated municipal waste material through a dry primary rotary disc screen for removing fine solids; and
      passing the liberated municipal waste material through a dry air knife separator for removing heavier solids from the liberated municipal waste material;
   treating solids in the stream of predominantly organic materials remaining after said removing step with moisture in a horizontal rotary flow and separating a pulp material fraction from a reject material fraction in said rotary flow; and
   defiberizing said pulp material fraction through gentle mechanical and thermal action; passing said defiberized pulp material fraction through an anaerobic digestion process; and passing reject material unaffected by said gentle mechanical and thermal action to other processing.

2. A waste treating method for handling municipal waste material in accordance with the steps of claim 1:
   wherein the fine solids removed in the dry primary disc screen are passed through a second dry rotary disc screen for further separation and recovery therefrom of fine organic materials.

3. A waste treating method for handling municipal waste material in accordance with the steps of claim 1:
   wherein said liberated municipal waste material is initially passed through an intensive magnetic field for separating metallic materials from said liberated municipal waste material.

4. A waste treating method for handling municipal waste material in accordance with the steps of claim 3:
   wherein the fine solids removed in the dry primary disc screen are passed through a secondary dry disc screen for further separation and recovery therefrom of fine, organic materials.

* * * * *